US012619419B2

(12) United States Patent
 Ishikawa et al.

(10) Patent No.: US 12,619,419 B2
(45) Date of Patent: May 5, 2026

(54) USER EQUIPMENT, SOFTWARE UPDATE SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 18/446,729

(22) Filed: Aug. 9, 2023

(65) Prior Publication Data

US 2024/0118885 A1     Apr. 11, 2024

(30) Foreign Application Priority Data

Oct. 5, 2022    (JP) ................................. 2022-160792

(51) Int. Cl.
 *G06F 8/65*          (2018.01)
(52) U.S. Cl.
 CPC ..................................... *G06F 8/65* (2013.01)

(58) Field of Classification Search
 CPC ..................................... G06F 8/65; G06F 8/60
 USPC ......................................................... 717/168
 See application file for complete search history.

(56) References Cited

U.S. PATENT DOCUMENTS

| | | | | |
|---|---|---|---|---|
| 2019/0026096 A1* | 1/2019 | Matsui | .................... | H04L 67/34 |
| 2019/0111907 A1* | 4/2019 | Harata | .................... | H04L 67/34 |
| 2020/0034138 A1* | 1/2020 | Ishikawa | ................ | H04L 67/12 |
| 2021/0011709 A1* | 1/2021 | Itatsu | ...................... | B60R 16/02 |
| 2022/0391195 A1* | 12/2022 | Nakamura | ............... | G06F 8/65 |
| 2024/0362007 A1* | 10/2024 | Kikuchi | .................. | G06F 8/65 |

FOREIGN PATENT DOCUMENTS

JP          2017149323 A      8/2017

* cited by examiner

*Primary Examiner* — Bradley A Teets
*Assistant Examiner* — Zengpu Wei
(74) *Attorney, Agent, or Firm* — Dickinson Wright, PLLC

(57) ABSTRACT

User equipment includes one or more processors configured to: receive data on updating software on an in-vehicle electronic control unit (ECU); transmit the received data to a vehicle; and display progress of a first update process when the first update process is performed. The first update process is a process of updating the software on the in-vehicle ECU using the received data.

9 Claims, 9 Drawing Sheets

OTA CENTER 500
COMMUNICATION DEVICE 190, 290

300 300a

31
RECEPTION
UNIT

32
STORAGE
UNIT

35
CONTROL
UNIT

34
TRANSMISSION
UNIT

340
TOUCH PANEL
DISPLAY

OTA CENTER 500
COMMUNICATION DEVICE 190, 290

USER EQUIPMENT, SOFTWARE UPDATE SYSTEM, CONTROL METHOD, AND NON-TRANSITORY STORAGE MEDIUM

CROSS-REFERENCE TO RELATED APPLICATION

This application claims priority to Japanese Patent Application No. 2022-160792 filed on Oct. 5, 2022, incorporated herein by reference in its entirety.

BACKGROUND

1. Technical Field

The present disclosure relates to user equipment, software update systems, control methods, and non-transitory storage media.

2. Description of Related Art

Japanese Unexamined Patent Application Publication No. 2017-149323 (JP 2017-149323 A) discloses a technique of updating software on an electronic control unit (ECU) mounted on a vehicle by Over-The-Air (OTA) technology.

SUMMARY

A vehicle can download new software (data) for an in-vehicle electronic control unit (ECU) by wirelessly communicating with an external server (e.g., an OTA center). In the vehicle, the target ECU (ECU whose software is a target to be updated) then sequentially performs installation of the updated software based on the downloaded software (data) and activation of the updated software. The software update can thus be performed.

For example, when software (control program) is updated by such OTA technology, software is downloaded from the OTA center via an in-vehicle communication device (e.g., a communication module such as a Data Communication Module (DCM)) or equipment owned by a user (user equipment; e.g., mobile equipment such as a smartphone).

When an update process of updating software on the in-vehicle ECU is performed, the progress of the update process and approval are notified in some cases. Notifications are displayed on devices such as a human-machine interface (HMI) mounted on a vehicle and user equipment. When the update process using software downloaded is performed via the in-vehicle communication device, or when the update process with software downloaded is performed via the user equipment, displaying the progress etc. on both the HMI and the user equipment may increase communication load and power consumption.

The present disclosure provides user equipment, software update system, control method, and non-transitory storage medium that can reduce communication load when the progress of an update process of updating software is displayed on an in-vehicle ECU.

(1) User equipment according to a first aspect of the present disclosure includes one or more processors. The one or more processors are configured to: receive data on updating software on an in-vehicle ECU; transmit the received data to a vehicle; and display progress of a first update process when the first update process is performed. The first update process is a process of updating the software on the in-vehicle electronic control unit using the received data.

With this configuration, the user equipment transmits the received data to the vehicle. The data (the software for the in-vehicle ECU) is thus distributed to the vehicle via the user equipment. When the first update process of updating the software on the in-vehicle ECU using the received data by the user equipment is performed, the one or more processors display the progress of the first update process. Information (data) necessary for the first update process is distributed (transmitted) to the vehicle via the user equipment. Therefore, the data that has already been received by the user equipment can be used when displaying the progress of the first update process. This can reduce the communication load.

(2) In the user equipment according to the first aspect of the present disclosure, the progress of the first update process may include progress of reception of the data by the one or more processors and progress of transmission of the data by the one or more processors.

With this configuration, the progress can be displayed using the information (data) on the software received by the user equipment. This can reduce the communication load.

(3) In the user equipment according to the first aspect of the present disclosure, the one or more processors may be configured to display information on a next action in the first update process in addition to the progress of the first update process.

With this configuration, in the update process of updating the software on the in-vehicle ECU, the information on the next action in the first update process is also displayed. This makes it possible to smoothly proceed with the software update process.

(4) In the user equipment according to the first aspect of the present disclosure, the one or more processors may be configured not to display progress of a second update process in a case where the second update process is being performed, even when there is a request to display the progress of the second update process. The second update process may be a process in which the vehicle receives the data without via the user equipment to update the software on the in-vehicle electronic control unit.

With this configuration, in the case where the second update process in which the software for the in-vehicle ECU is distributed to the vehicle without via the user equipment and the software (the data on updating the software) on the in-vehicle ECU is updated using this software (data) is being performed, the one or more processors of the user equipment will not display the progress of the second update process even when there is a request to display the progress of the second update process. Therefore, the user equipment does not need to acquire information (data) necessary to display the progress of the second update process through communication etc. This can reduce the communication load.

(5) In the user equipment according to the first aspect of the present disclosure, the data may be updated software on the in-vehicle electronic control unit.

(6) A software update system according to a second aspect of the present disclosure is a software update system that updates software on an ECU. The software update system includes: a server configured to distribute data on updating the software on the electronic control unit; a vehicle equipped with the ECU and configured to communicate with the server; and user equipment. The user equipment is configured to communicate with the server and the vehicle. The user equipment is configured to display progress of a first update process, the first update process being a process in which the data distributed from the server is distributed to the vehicle via the user equipment to update the software on the ECU. The user equipment is configured not to display progress of a second update process, the second update process being a process in which the data distributed from the server is distributed to the vehicle without via the user equipment to update the software on the ECU.

With this configuration, the server functions as an OTA center that distributes data. The data is distributed from the server to the vehicle without via the user equipment by communication between the vehicle and the server. The data distributed from the server is also distributed to the vehicle via the user equipment. The user equipment displays the progress of the first update process in which the data distributed from the server is distributed to the vehicle via the user equipment to update the software on the ECU. On the other hand, the user equipment will not display the progress of the second update process in which the data distributed from the server is distributed to the vehicle without via the user equipment to update the software on the ECU.

The user equipment therefore does not need to acquire information (data) necessary to display the progress of the second update process through communication etc. This can reduce the communication load. Information (data) necessary for the first update process is distributed to the vehicle via the user equipment. Therefore, the data that has already been received by the user equipment can be used when displaying the progress of the first update process. This can reduce the communication load.

(7) In the software update system according to the second aspect of the present disclosure, the progress of the first update process may include progress of reception of the data by the user equipment and progress of transmission of the data from the user equipment to the vehicle.

With this configuration, the progress can be displayed using the information (data) on the software distributed to the user equipment. This can reduce the communication load.

(8) In the software update system according to the second aspect of the present disclosure, the user equipment may be configured to display information on a next action in the first update process in addition to the progress of the first update process.

With this configuration, in the update process of updating the software on the in-vehicle ECU, the information on the next action in the first update process is displayed. This makes it possible to smoothly proceed with the software update process.

(9) A control method according to a third aspect of the present disclosure is a control method in which progress of an update process of updating software on an in-vehicle ECU is displayed on user equipment that updates the software on the in-vehicle ECU by receiving data on the software that is distributed from a server and transmitting the received data to a vehicle. The control method includes: determining whether the update process is performed using the data that is transmitted to the vehicle via the user equipment; and displaying the progress of the update process when determination is made that the update process is performed using the data that is transmitted to the vehicle via the user equipment.

With this method, the user equipment updates the data on the in-vehicle ECU by receiving the data distributed from the server and transmitting the received data to the vehicle. The user equipment displays the progress of the update process when determination is made that the update process is performed using the data that is transmitted to the vehicle via the user equipment. Since the progress can be displayed using information (data) on the software distributed to the user equipment, the communication load can be reduced.

(10) A non-transitory storage medium according to a fourth aspect of the present disclosure stores a program that causes a computer to perform the control method according to (9).

By using this program, the progress can be displayed using the information (data) on the software distributed to the user equipment. This can reduce the communication load.

With the present disclosure, it is possible to reduce the communication load when notifying the progress of the update process of updating software on the in-vehicle ECU.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
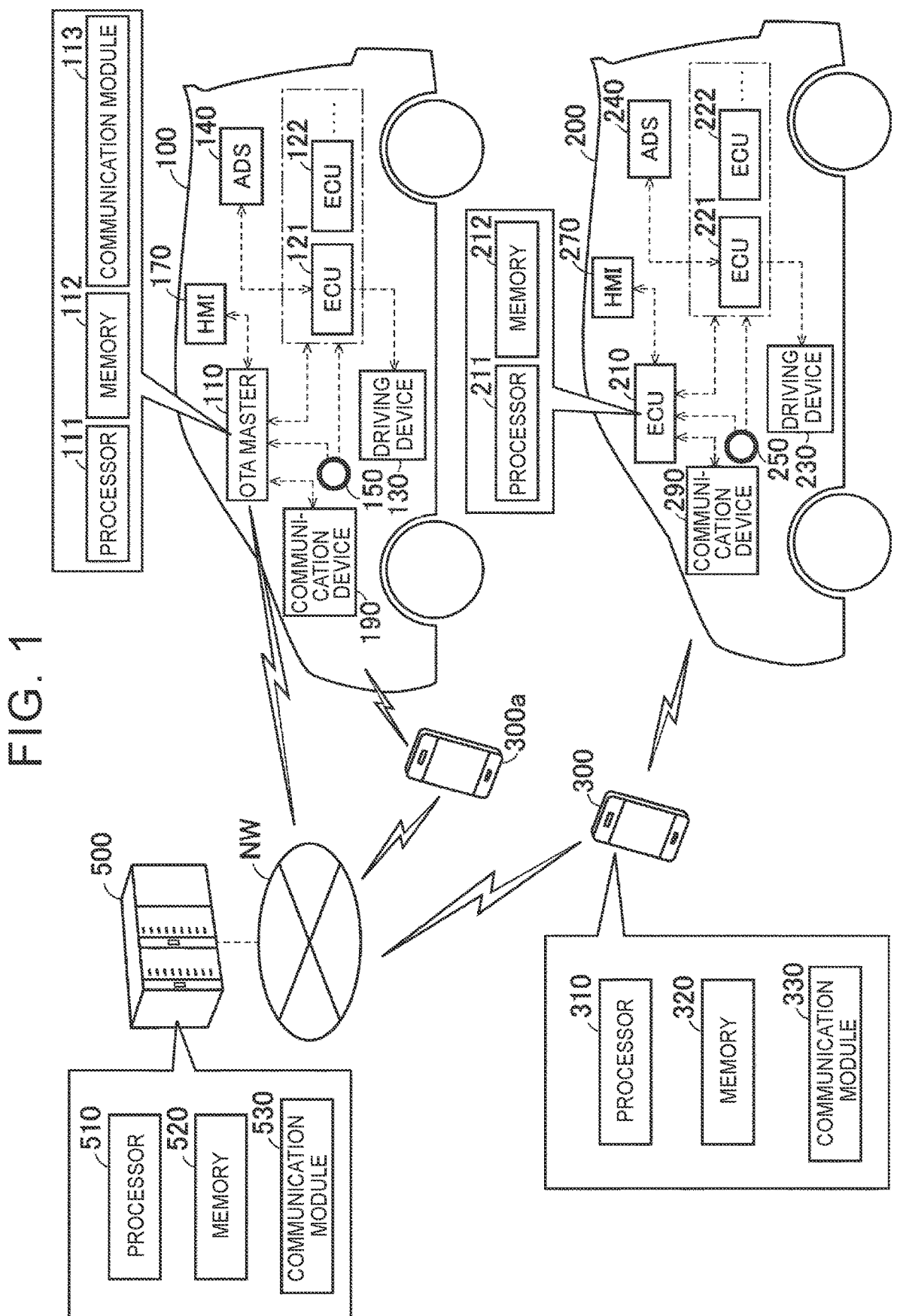
FIG. 1 shows the configuration of a software update system according to an embodiment of the present disclosure.

FIG. 1 shows the configuration of a software update system according to the present embodiment. With reference to FIG. 1, this software update system includes a vehicle 100, a vehicle 200, user equipment 300, user equipment 300a, an OTA center 500, and a communication network NW. "OTA" is an abbreviation for "Over The Air."

Each of the vehicles 100, 200 is, for example, a battery electric vehicle (BEV) without an internal combustion engine. The vehicle 100 has an OTA access function (function to wirelessly communicate directly with the OTA center 500). On the other hand, the vehicle 200 does not have the OTA access function. The vehicle 100 can wirelessly communicate directly with the OTA center 500 (communication network NW). However, the vehicle 200 cannot communicate with the OTA center 500 without via another communication device (i.e., a communication device different from that mounted on the vehicle 200 itself). The vehicle 200 wirelessly communicates with the OTA center 500 through the user equipment 300 (via the user equipment 300). The vehicle 100 can not only wirelessly communicate directly with the OTA center 500, but also wirelessly communicate with the OTA center 500 via the user equipment 300*a*.

The user equipment 300 and the user equipment 300*a* have the same configuration. Therefore, the user equipment 300 will be described below. The user equipment 300 is configured to be carried around by a user. The user equipment 300 is mobile equipment that is carried and operated by a user of the vehicle 200 (vehicle manager). In the embodiment, a smartphone with a touch panel display is used as the user equipment 300. The smartphone contains a computer and has a speaker function. However, the user equipment 300 is not limited to this, and any equipment that can be carried by the user of the vehicle 200 can be used as the user equipment 300. For example, a laptop, a tablet, a portable gaming device, and a wearable device (such as a smartwatch, smart glasses, and smart gloves) can also be used as the user equipment 300.

The user equipment 300 includes a processor 310, a memory 320, and a communication module 330. The processor 310 includes, for example, a central processing unit (CPU). The memory 320 includes a non-volatile memory such as a flash memory. The communication module 330 includes a communication interface (I/F) for direct wireless communication with the OTA center 500 (communication network NW). The communication module 330 also includes a communication OF for direct wireless communication with the vehicle 200. The vehicle 200 and the OTA center 500 can thus send and receive data to and from each other via the user equipment 300. For example, the user equipment 300 specifies the address of the OTA center 500 and accesses the communication network NW in response to a request by the vehicle 200. This allows the vehicle 200 (ECU 210) and the OTA center 500 to send and receive data to and from (communicate with) each other via the user equipment 300.

Application software (hereinafter referred to as "mobile app") for using a service provided by the OTA center 500 is installed in the user equipment 300. Identification information (equipment identification (ID)) of the user equipment 300 is registered on the OTA center 500 in association with identification information (vehicle ID) of the vehicle 200 through the mobile app. The user equipment 300 can send and receive information to and from the OTA center 500 through the mobile app.

The user equipment 300*a* is mobile equipment that is carried and operated by a user of the vehicle 100. Identification information (equipment ID) of the user equipment 300*a* is registered on the OTA center 500 in association with identification information (vehicle ID) of the vehicle 100 through a mobile app installed in the user equipment 300*a*. The user equipment 300*a* can send and receive information to and from the OTA center 500 through the mobile app. Each of the user equipment 300 and the user equipment 300*a* includes a touch panel display that functions as both an input device and a display device.

The OTA center 500 is a server that provides a vehicle software update service using the OTA technology. The OTA center 500 is configured to perform a software update on an in-vehicle ECU remotely from the OTA center 500 via a communication section. The OTA center 500 distributes software for the in-vehicle ECU. The term "ECU" means an electronic control unit.

The OTA center 500 includes a processor 510, a memory 520, and a communication module 530. The processor 510 includes, for example, a CPU. The memory 520 includes a non-volatile memory such as a flash memory. The communication module 530 is connected to the communication network NW by wire. The communication module 530 communicates with each of a plurality of vehicles (including the vehicle 100) and a plurality of pieces of mobile equipment (including the user equipment 300) via the communication network NW. The communication network NW is a wide area network formed by, for example, the Internet and wireless base stations. The communication network NW may include a mobile phone network.

The vehicle 100 includes an OTA master 110 and a plurality of ECUs (including ECUs 121, 122). The vehicle 200 includes a plurality of ECUs (including ECUs 210, 221, and 222). The OTA master 110 contains a computer and functions as an in-vehicle diagnostic device. Each vehicle may include any number of ECUs. Each in-vehicle ECU contains a computer that includes at least one processor and at least one memory. Each in-vehicle ECU may include a plurality of microcomputers in the form of, for example, a main microcomputer and a sub-microcomputer.

in the vehicle 100, the OTA master 110 and each ECU are connected to each other via a communication bus, and are configured to communicate with each other by wire. In the vehicle 200, the ECUs are connected to each other via a communication bus, and are configured to communicate with each other by wire. The method for communication between the control devices in each vehicle is not particularly, but, for example, may be a Controller Area Network (CAN) or Ethernet (registered trademark).

The OTA master 110 includes a processor 111, a memory 112, and a communication module 113. The processor 111 includes, for example, a CPU. The memory 112 includes a non-volatile memory such as a flash memory. The communication module 113 includes a communication OF for direct wireless communication with the OTA center 500. For example, the communication module 113 specifies the address of the OTA center 500 and accesses the communication network NW. Wireless communication is thus established between the vehicle 100 (communication module 113) and the OTA center 500. The communication module 113 may include a telematics control unit (TCU) and/or a Data Communication Module (DCM) that perform wireless communication.

In the vehicle 200, the ECU 210 includes a processor 211 and a memory 212. The processor 211 includes, for example, a CPU. The memory 212 includes a non-volatile memory such as a flash memory. The vehicle 200 further includes a communication device 290. The ECU 210 communicates with devices outside the vehicle 200 through the communication device 290. The communication device 290 includes a communication OF for direct wireless communication with the user equipment 300. The communication device 290 and the user equipment 300 may perform short-range communication by, for example, a wireless local area network (LAN), near field communication (NFC), or Bluetooth (registered trademark). The communication device 290 may communicate directly with the user equipment 300 that is present inside the vehicle 200 or within a range around the vehicle 200. The user equipment 300 that is present inside or outside the vehicle 200 and the ECU 210 may send and receive information to and from each other via the communication device 290 while the vehicle 200 is stopped (parked). The user equipment 300 that is present inside the vehicle 200 and the ECU 210 may send and receive information to and from each other via the communication device 290 while the vehicle 200 is traveling. The ECU 210 requests the user equipment 300 to communicate with the OTA center 500 as described above. The ECU 210 can thus communicate with the OTA center 500 via the user equipment 300.

In the vehicle 100, the OTA master 110 can communicate with the user equipment 300a through a communication device 190 in addition to through the communication module 113. The communication device 190 includes a communication I/F for direct wireless communication with the user equipment 300a. The communication device 190 and the user equipment 300a may perform short-range communication such as wireless LAN, NFC, or Bluetooth (registered trademark). The communication device 190 may communicate directly with the user equipment 300a that is present inside the vehicle 100 or within a range around the vehicle 100. The user equipment 300a that is present inside or outside the vehicle 100 and the OTA master 110 may send and receive information to and from each other via the communication device 190 while the vehicle 100 is stopped. The user equipment 300a that is present inside the vehicle 100 and the OTA master 110 may send and receive information to and from each other via the communication device 190 while the vehicle 100 is traveling. The OTA master 110 can communicate with the OTA center 500 via the user equipment 300a by requesting the user equipment 300a to communicate with the OTA center 500 as described above.

As described above, each of the OTA master 110 of the vehicle 100 and the ECU 210 of the vehicle 200 is configured to communicate wirelessly with the OTA center 500. Each of the vehicles 100, 200 can communicate with the OTA center 500 in both a case that the vehicle is stopped and a case that the vehicle is traveling. Each of the OTA master 110 and the ECU 210 manages in-vehicle information, receives a campaign, and manages a software update sequence. Hereinafter, the OTA master 110 and the ECU 210 will be referred to as "update masters" when not distinguished from each other. The OTA master 110 is the update master of the vehicle 100, and the ECU 210 is the update master of the vehicle 200.

The vehicles 100, 200 are autonomous vehicles configured to perform automated driving. The vehicles 100, 200 are configured to be able to perform both manned driving and unmanned driving. Although the vehicles 100, 200 are configured to perform unmanned autonomous driving, the vehicles 100, 200 can also be manually driven by the user (manned driving). The vehicles 100, 200 can also perform automated driving (e.g., auto cruise control) during manned driving. The level of automated driving may be fully automated driving (level 5), or may be conditional automated driving (e.g., level 4).

Each of the vehicles 100, 200 further includes a driving device 130, 230 and an autonomous driving system (ADS) 140, 240, respectively. In the vehicle 100, the ECU 121 is configured to control the driving device 130. In the vehicle 200, the ECU 221 is configured to control the driving device 230.

Each of the driving devices 130, 230 includes an accelerator device, a brake device, and a steering device. The accelerator device includes, for example, a motor generator (hereinafter referred to as "MG"), a power control unit (PCU), and a battery. The MG rotates drive wheels of the vehicle. The PCU drives the MG. The battery supplies electric power for driving the MG to the PCU.

Each of the ADSs 140, 240 includes a perception sensor that perceives the surroundings of the vehicle (e.g., at least one of the following sensors: a camera, a millimeter wave radar, and a Light Detection and Ranging (LiDAR) sensor). Each of the ADSs 140, 240 performs a process related to automated driving, based on information sequentially acquired by the perception sensor. Specifically, each of the ADSs 140, 240 cooperates with the ECU 121, 221 to generate a travel plan (information indicating the future behavior of the vehicle) depending on the surroundings of the vehicle, respectively. Each of the ADSs 140, 240 then requests the ECU 121, 221 to control various actuators in the driving device 130, 230 to cause the vehicle 100, 200 to travel depending on the travel plan, respectively.

Each of the vehicles 100, 200 further includes a start switch 150, 250 and an HMI 170, 270, respectively.

Each of the start switches 150, 250 is a switch for the user to start a vehicle system (control system for the vehicle 100, 200, respectively). Each of the start switches 150, 250 is installed in, for example, a vehicle cabin. The start switch is commonly referred to as "power switch" or "ignition switch." The vehicle system (including each ECU mounted on the vehicle) is switched between on (activated) and off (deactivated) when the user operates the start switch 150, 250. By the start switch 150, 250 being turned on, the vehicle system in the deactivated state is started and brought into the activated state (hereinafter also referred to as "IG-ON"). By the start switch 150, 250 being turned on while the vehicle system is in the activated state, the vehicle system is brought into the deactivated state (hereinafter also referred to as "IG-OFF").

The operation to turn on the start switch 150, 250 is an operation to switch the state of the vehicle from IG-OFF to IG-ON. When the user turns on the start switch 150, 250, a start request is input to each in-vehicle ECU. That is, each in-vehicle ECU receives the start request sent by the user. The operation to turn off the start switch 150, 250 is an operation to switch the state of the vehicle from IG-ON to IG-OFF. When the user turns off the start switch 150, 250, a shutdown request is input to each in-vehicle ECU. That is, each in-vehicle ECU receives the shutdown request sent by the user. The operation to turn off the start switch 150, 250 is prohibited while the vehicle is traveling.

Each of the HMIs 170, 270 includes an input device and a display device. Each of the HMIs 170, 270 may include a touch panel display that functions as both an input device and a display device. Each of the HMIs 170, 270 may include an input device and a display device of a car navigation system.

Figure 2:
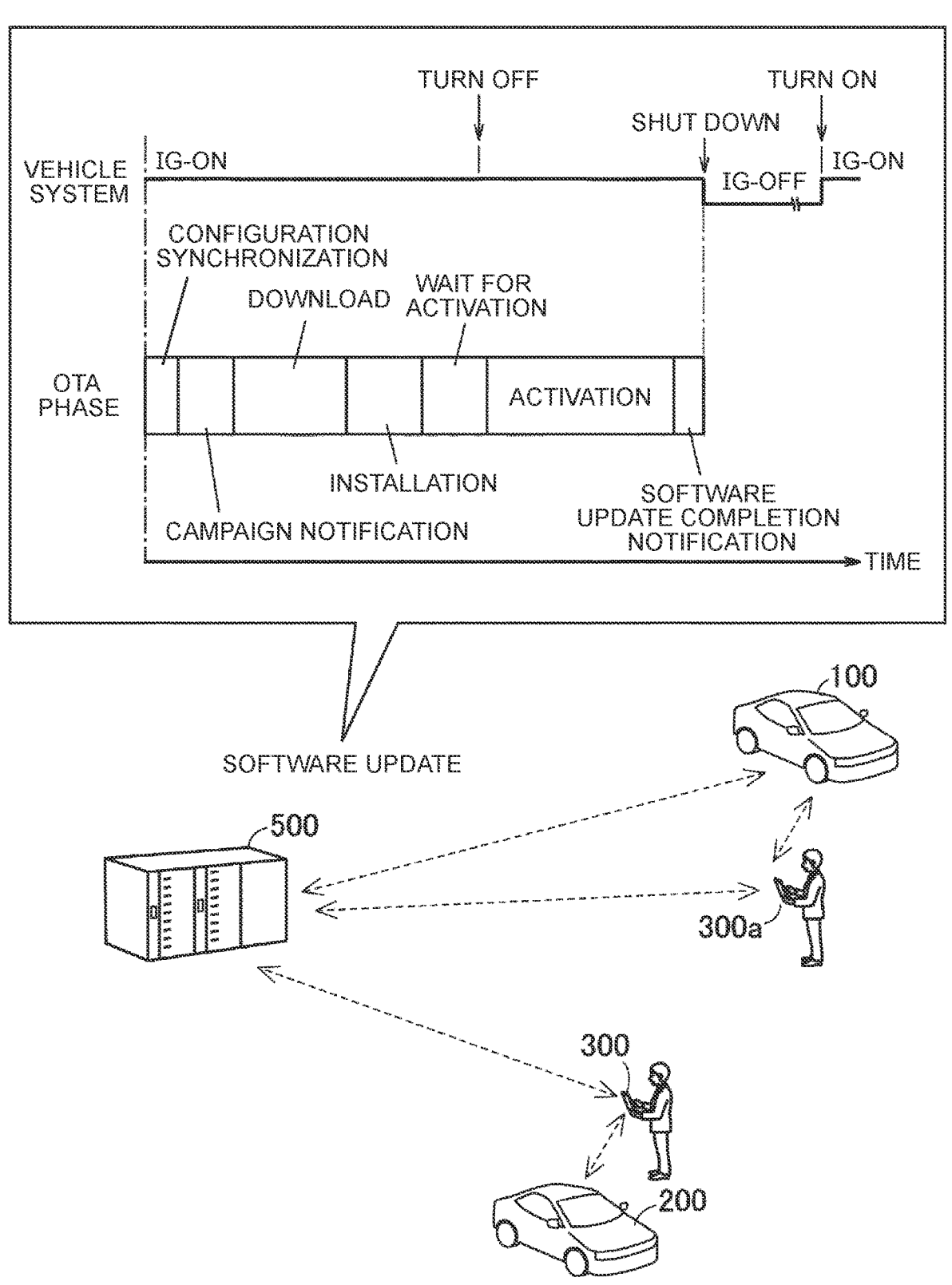
FIG. 2 illustrates an overview of a software update method according to the embodiment.

FIG. 2 illustrates an overview of a software update method according to the present embodiment. With reference to FIG. 2 together with FIG. 1, a process related to software update (more specifically, an update of vehicle software using the OTA technology) is performed in order of a procedure including configuration synchronization, campaign notification and approval to application, download, installation, activation, and notification of software update completion. The process described below is performed by the OTA center 500 and each vehicle (including the vehicles 100, 200) that receives software distribution from the OTA center 500. The number of vehicles that receive the distribution from the OTA center 500 may be about 50, may be 100 or more and less than 1000, or may be 1000 or more. The number of vehicles that receive the distribution from the OTA center 500 may be less than 50.

The vehicle in the IG-ON state repeats the configuration synchronization every preset period. The vehicle in the IG-ON state also performs the configuration synchronization when the vehicle receives a request for configuration synchronization by the OTA center 500. The process of configuration synchronization by the vehicle includes sending vehicle configuration information to the OTA center 500. The vehicle configuration information includes, for example, hardware information (information indicating product numbers of hardware, identifiers of the ECUs, etc.) and software information (information indicating product numbers of software, etc.) of the individual ECUs in the vehicle.

When the OTA center 500 receives the vehicle configuration information from the vehicle, the OTA center 500 checks for any currently available campaign (software update). When there is any campaign that is applicable to the vehicle, the OTA center 500 sends an approval request signal that requests the user of the vehicle to approve of download new software (updated version of software) related to that campaign. The approval request signal includes information on the campaign (campaign information). The campaign information may include, for example, at least one of the following pieces of information: campaign attribute information (information indicating the purpose of the software update, the function(s) of the vehicle that may be affected by the update, etc.), a list of vehicles that are targets for the campaign, information on ECUs that are targets for the campaign (e.g., software information before and after the update), and information on notifications to be sent to the user before and after the update. The campaign to be notified may be a newly available campaign or may be a campaign that was not previously applied. Hereinafter, sending of the approval request signal will also be referred to as "campaign notification."

When the vehicle receives a campaign notification (approval request signal), the vehicle requests the user to enter whether to approve of apply the campaign. For example, the vehicle may display a message such as "New software is available. Do you want to apply this software to this vehicle?" on the in-vehicle HMI (HMI 170, 270) or the user equipment 300, 300a. The vehicle thus requests the user to enter an input indicating either "approval" or "decline." When the user enters an input indicating "approval," the vehicle performs a process related to download that will be described below. When the user enters an input indicating "decline," the vehicle does not perform the process related to download. In this case, the OTA center 500 ends the process related to software update without proceeding to a download phase.

In the present embodiment, the OTA center 500 and the update master of the vehicle (e.g., the OTA master 110 or the ECU 210) perform the process related to download in the following procedure.

The update master of the vehicle requests the OTA center 500 for a distribution package including the new software. The update master then downloads (receives and saves) the distribution package from the OTA center 500. The distribution package may include, in addition to the new software (e.g., a set of update data for each of the ECUs that are target for the campaign), package attribute information (information indicating the update category, the number of pieces of update data in the distribution package, the order of installation for each ECU, etc.), and update data attribute information (an identifier of a target ECU, verification data for verifying the validity of the update data, etc.). The target ECU is an ECU whose software is a target to be updated. For example, the target ECU may be the ECU 121 or 221, and the software to be updated may be an automated driving control program. The target ECU may be the update master.

The distribution package is saved in a storage device (e.g. the memory 112 or 212) of the update master through the process related to download described above. After the download is completed, the update master verifies the authenticity of the downloaded distribution package. When the verification result is "normal," the update master notifies the OTA center 500 of the software update status (completion of the download). This notification means that the download was successful.

After the download succeeds, the vehicle performs installation. The update master requests at least one target ECU (e.g. the ECU 121 or 221) to output the state of the target ECU and a diagnostic trouble code (DTC). The update master determines for each target ECU whether installation can be performed, based on the state of the target ECU and the DTC. The update master transfers the new software (update data) to the target ECU for which installation can be performed. When the target ECU receives the update data, the target ECU installs the received update data (writes the received update data to a non-volatile memory).

When the transfer of the update data from the update master to the target ECU is completed, the target ECU sends a transfer completion notification to the update master. When the update master receives the transfer completion notification, the update master requests the target ECU for integrity verification. In response to this request, the target ECU performs verification using integrity verification data (verification data). The target ECU then sends the verification result to the update master. The update master saves the verification result (whether the installation was completed (normal), failed, or was cancelled) of each target ECU. When the integrity verification is completed by all the target ECUs and the verification results of all the target ECUs are "normal," the update master notifies the OTA center 500 of the software update status (completion of the installation). This notification means that the installation was successful.

After the installation is successfully performed following the successful download, the vehicle waits for activation. When the start switch (e.g., the start switch 150 or 250) of the vehicle is subsequently turned off, the update master displays a predetermined message on the in-vehicle HMI or the user equipment 300, 300a. By displaying the predetermined message, the update master requests the user to enter an input indicating either "approval" or "decline." When the user enters an input indicating "approval," the update master performs activation (activation of the installed software). In the case where the update master fails to activate the installed software, the update master requests the OTA center 500 to rollback the software. In response to the rollback request transmitted by the vehicle, the OTA center 500 distributes rollback software to the vehicle. The update master can thus restore (rollback) the software that failed to be activated to its original version by using the rollback software. When the user enters an input indicating "decline," the update master cancels the process related to software update without performing activation, and the vehicle system is shut down.

When the update master has successfully activated the installed software, the update master displays the result of the software update on the in-vehicle HMI or the user equipment 300, 300a. The update master then notifies the OTA center 500 of the software update status (completion of the software update). This notification means that the OTA software update was successful. In response to this notification, the control system for the vehicle is shut down, and the vehicle system is switched to IG-OFF. When the start switch of the vehicle is subsequently turned on, the vehicle system is switched to IG-ON. An update program (new version of the software) is thus started on the target ECU. The software to be updated is not limited to a control program for a driver assistance system such as the automated driving control program described above, and may be any software. When a distribution package (software) is downloaded and software on the target ECU is updated as described above, it is preferable to display the progress of the software update process to the user. When software (distribution package) distributed by the OTA center 500 is downloaded via the in-vehicle communication device (OTA master 110 (communication module 113)), or when software distributed by the OTA center 500 is downloaded via the user equipment 300, 300a, communication load and power consumption may increase if the progress is displayed on both the in-vehicle HMI and the user equipment 300, 300a. In the present embodiment, when software is downloaded via the user equipment 300, 300a, the progress of the update process is displayed on the user equipment 300, 300a in order to suppress increases in communication load and power consumption.

Figure 3:
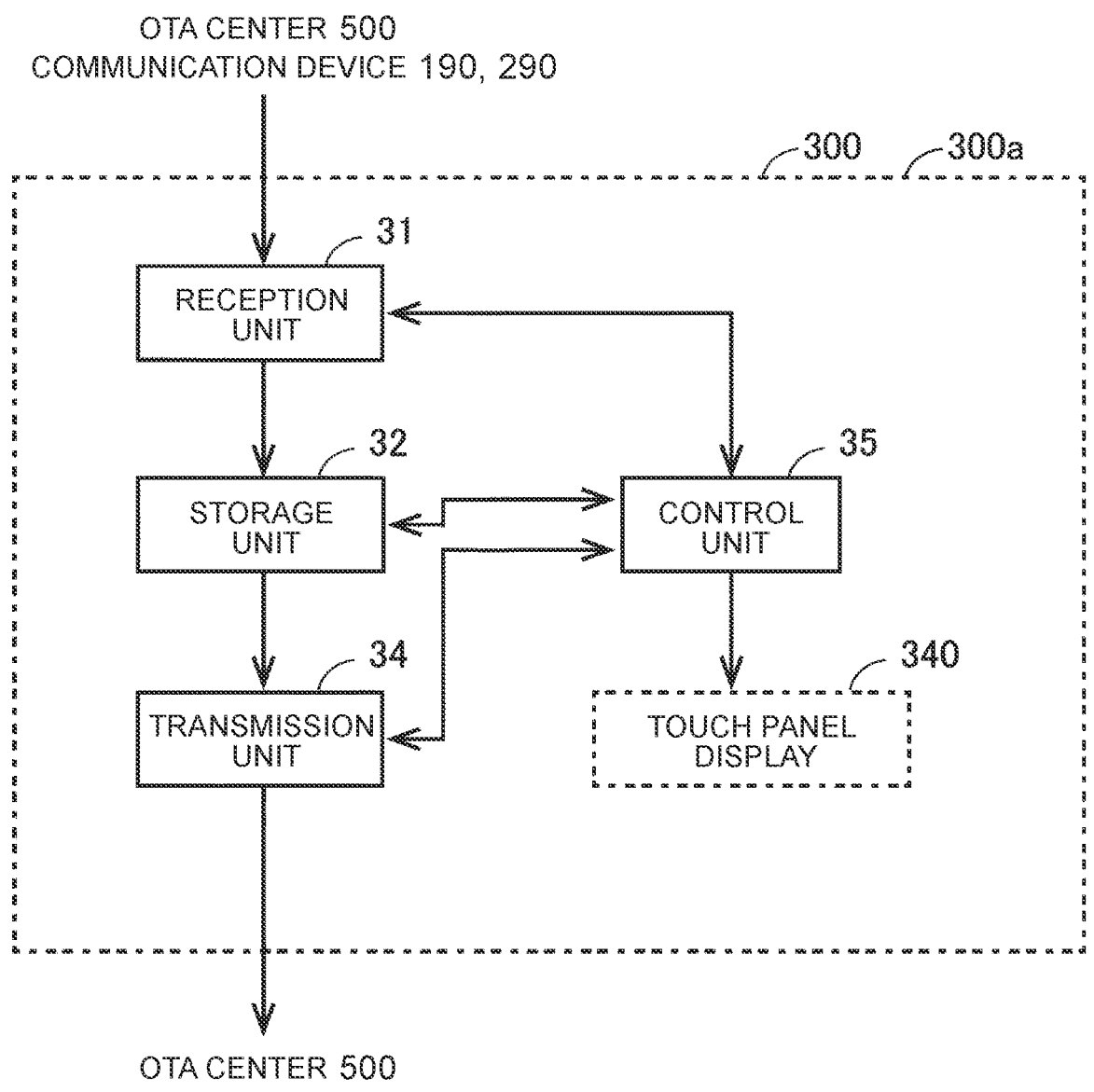
FIG. 3 shows an example of functional blocks configured in user equipment.

FIG. 3 shows an example of functional blocks configured in the user equipment 300, 300a. These functional blocks are functions configured by the processor, memory, communication module, etc. of the user equipment 300, 300a.

When a reception unit 31 receives a campaign notification from the OTA center 500, a control unit 35 displays "approval" and "decline" on a touch panel display 340. When the user selects (operates) "approval," a transmission unit 34 requests the OTA center 500 to distribute software (distribution package), as instructed by the update master of the vehicle.

Figure 4:
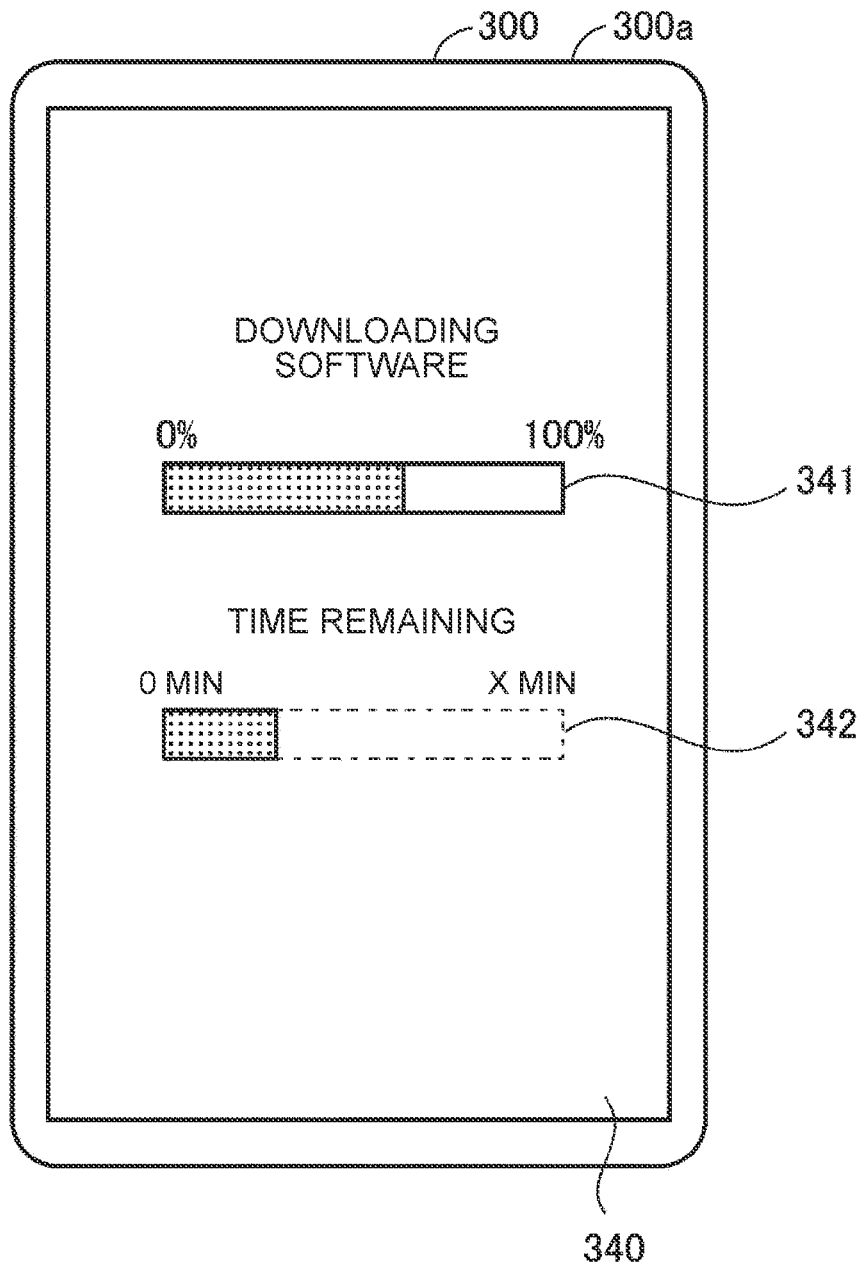
FIG. 4 shows an example of a software reception status displayed on a touch panel display.

The reception unit 31 receives the software sent from the OTA center 500 and saves the received software in a storage unit 32. The software is thus downloaded. When the download of the software is started, the control unit 35 displays the software reception status (download status) on the touch panel display 340 of the user equipment 300, 300a. FIG. 4 shows an example of the software reception status displayed on the touch panel display 340. As shown in FIG. 4, for example, the software reception status indicates "downloading software" (software download is in progress) and also indicates "percentage complete" 341 (percentage (%) of the software that has been downloaded to the storage unit 32) and "time remaining" 342 (time (min) remaining to complete the download). The software (distribution package) distributed from the OTA center 500 contains information on the number of bytes (number of packets) of the software. The control unit 35 calculates the "percentage complete" 341 and the "time remaining" 342 by using this information and the transmission speeds (bps) of the OTA center 500 and the user equipment 300, 300a. The control unit 35 displays the calculation results on the touch panel display 340.

Figure 5:
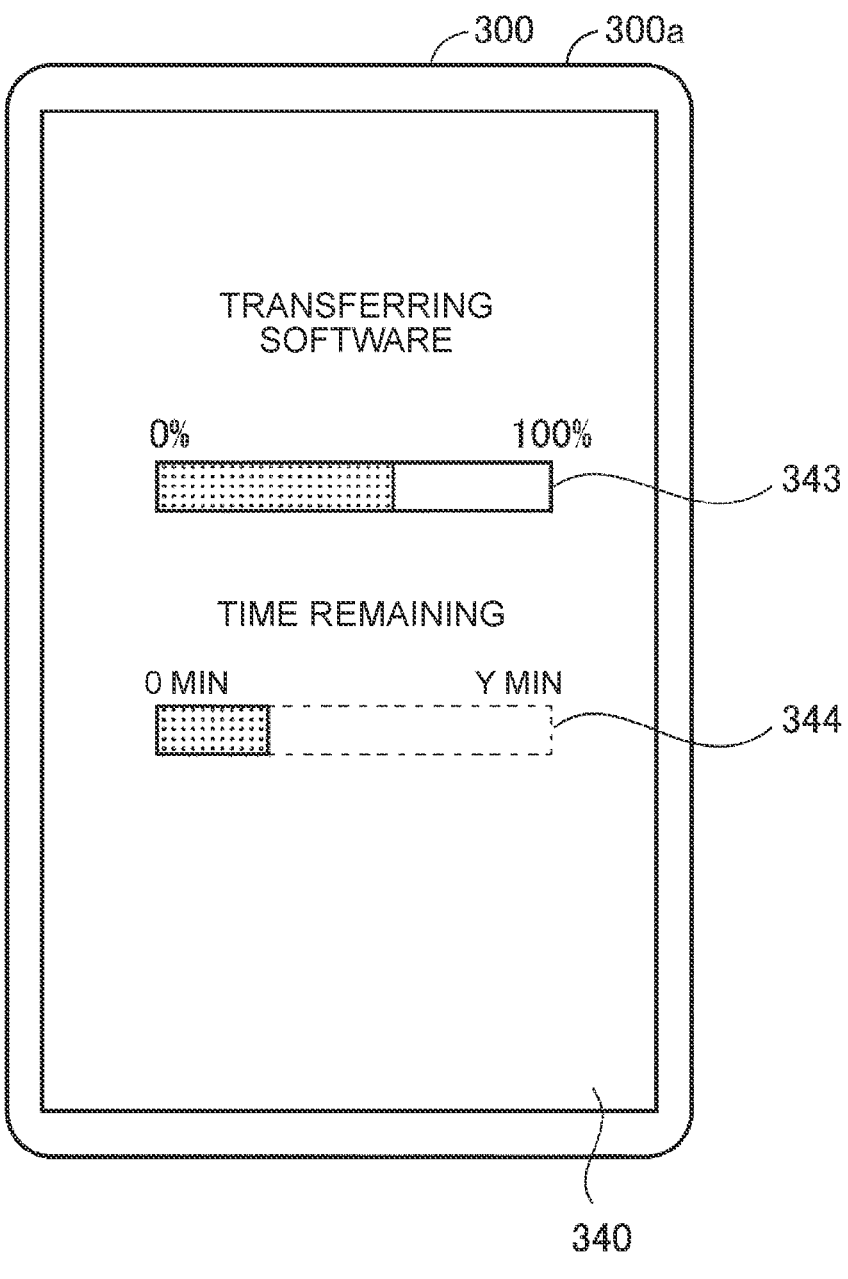
FIG. 5 shows an example of a software transfer status displayed on the touch panel display.

When the download (saving) of the software to the storage unit 32 is completed, the control unit 35 causes the transmission unit 34 to transmit (transfer) the downloaded software to the update master (OTA master 110 or ECU 210) of the vehicle. When the transfer (transmission) of the software is started, the control unit 35 displays the software transmission status (transfer status) on the touch panel display 340 of the user equipment 300, 300a. FIG. 5 shows an example of the software transfer status displayed on the touch panel display 340. As shown in FIG. 5, for example, the software transfer status indicates "transferring software" (software transfer is in progress) and also indicates "percentage complete" 343 (percentage (%) of the software that has been transferred to the update master) and "time remaining" 344 (time (min) remaining to complete the transfer). The control unit 35 calculates the "percentage complete" 343 and the "time remaining" 344 by using the number of bytes (number of packets) of the software being transferred and the transmission speeds (bps) of the communication device 190, 290 and the user equipment 300, 300a. The control unit 35 displays the calculation results on the touch panel display 340.

Figure 6:
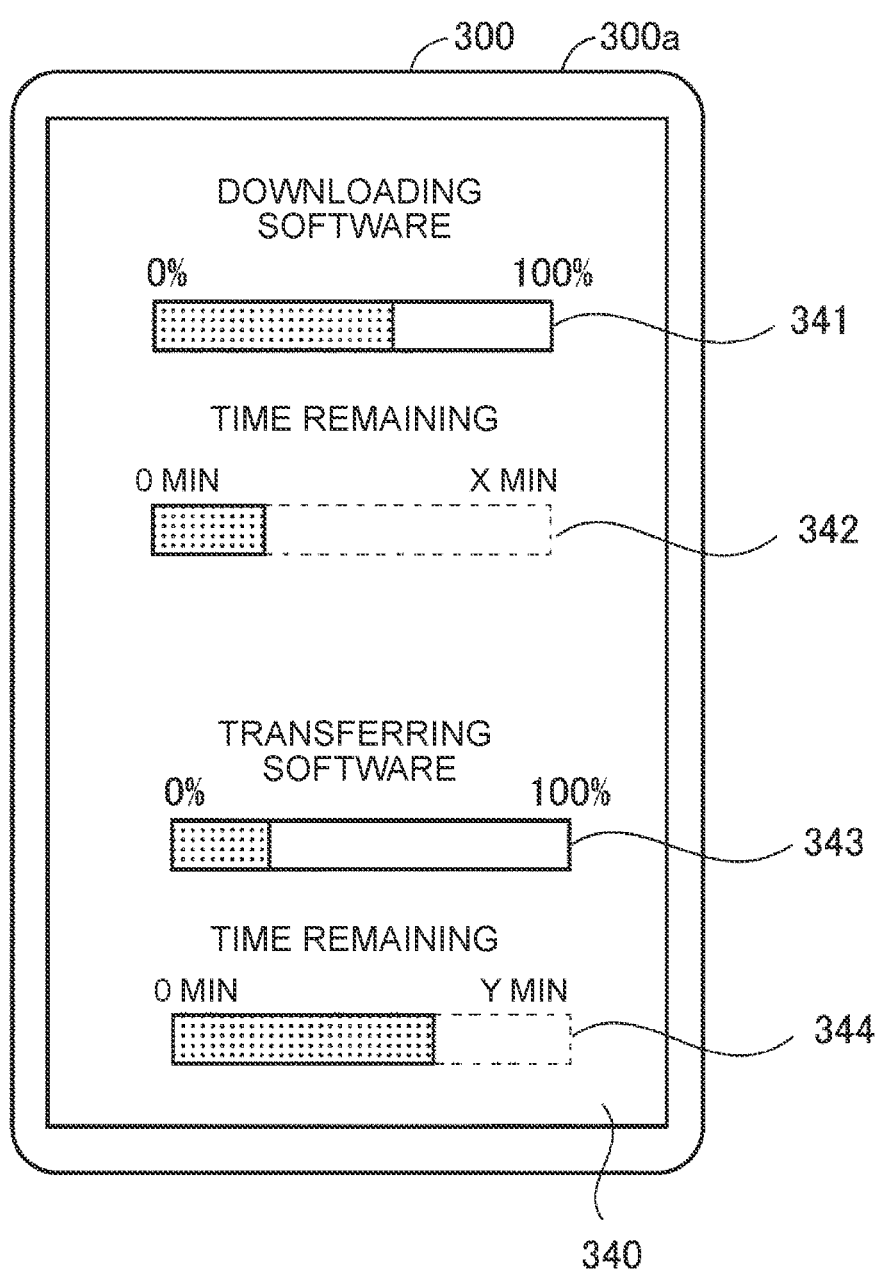
FIG. 6 shows an example of the software reception status and the software transfer status both displayed on the touch panel display.

In the case where the user equipment 300, 300a is configured to transmit (transfer) software in parallel with receiving the software, the software reception status (download status) and the software transfer status are displayed on the touch panel display 340. FIG. 6 shows an example of the software reception status and the software transfer status both displayed on the touch panel display 340. As shown in FIG. 6, the software reception status and the software transfer status are simultaneously displayed on the touch panel display 340.

Figure 7:
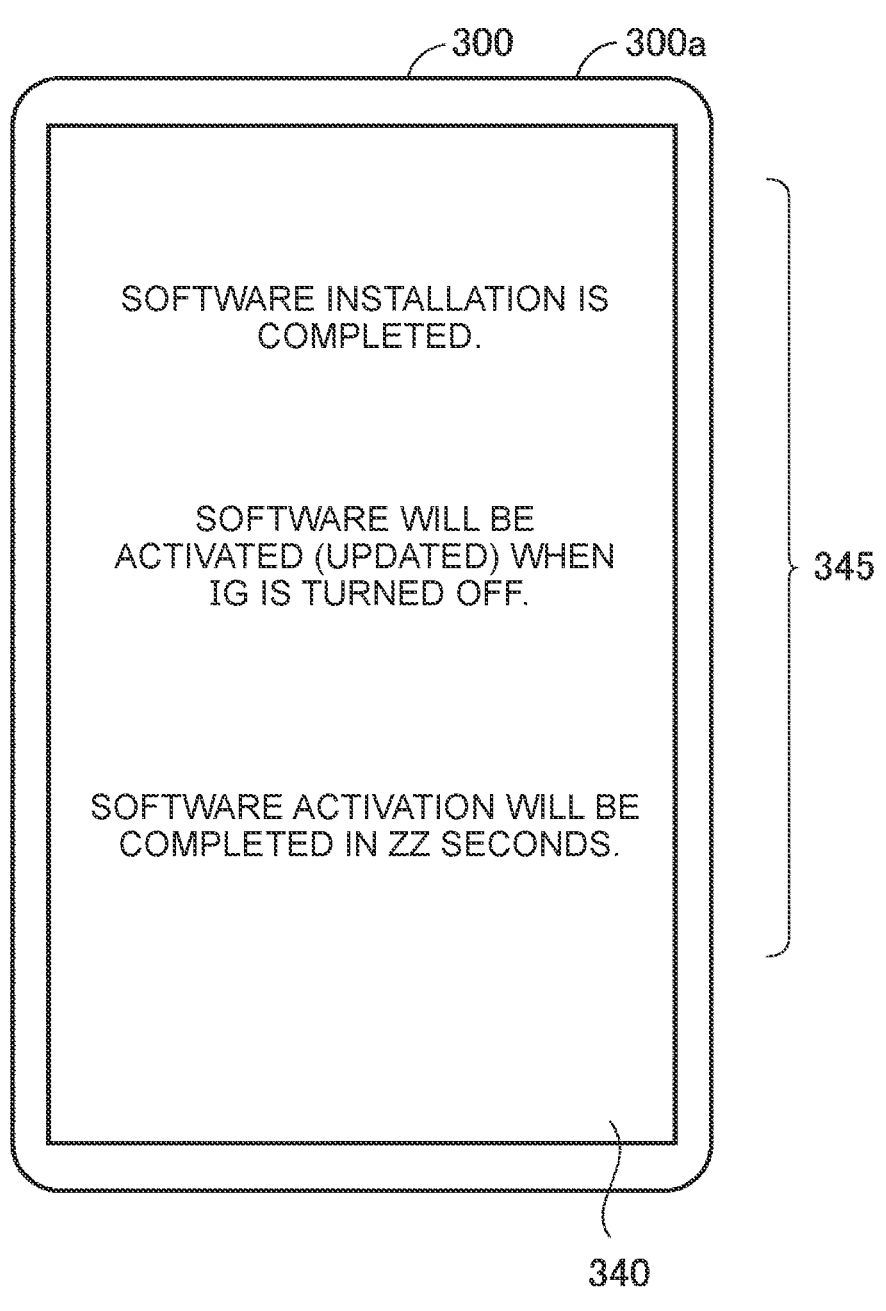
FIG. 7 shows an example of a guidance display displayed on the touch panel display.

When the transfer (transmission) of the software from the user equipment 300, 300a is completed, the download of the software (distribution package) to the storage device of the update master is completed. The software (update data) is then installed in the target ECU as described above. When the installation in the target ECU is completed, the update master or the OTA center 500 sends an installation completion notification to the user equipment 300, 300a. When the reception unit 31 receives the installation completion notification, the control unit 35 displays a guidance display on the touch panel display 340. FIG. 7 shows an example of the guidance display displayed on the touch panel display 340. As shown in FIG. 7, a "guidance display" 345 is guidance indicating that "installation is completed" and "IG needs to be turned off (start switch needs to be turned off) in order to activate the software (in order to update the software)" and also indicating "time required to activate the software." Displaying such a "guidance display" 345 can encourage the user to turn off the IG rather than leaving the vehicle in the IG-ON state. The update process can thus be smoothly performed.

Figure 8:
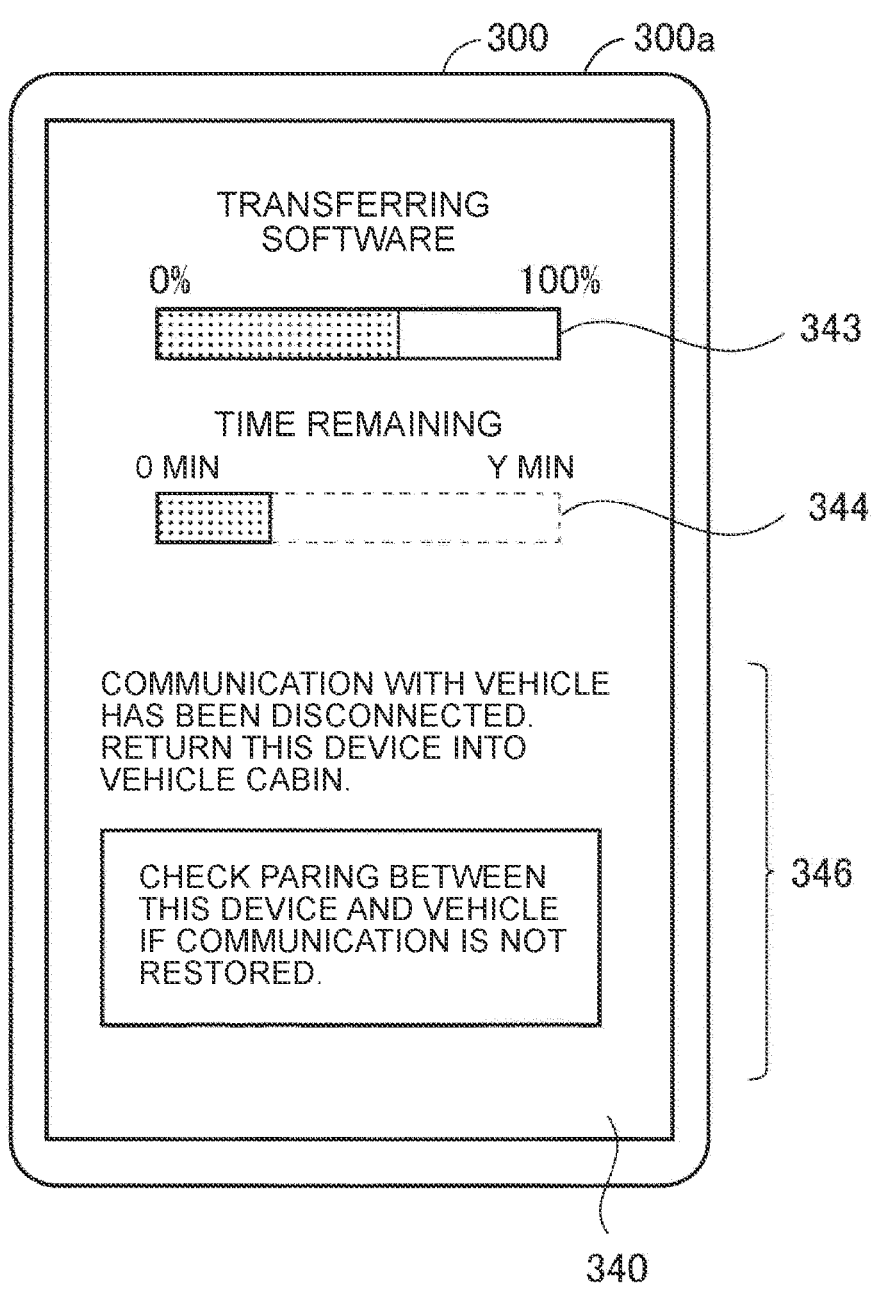
FIG. 8 shows an example of a confirmation display displayed on the touch panel display.

In the present embodiment, the user equipment 300, 300a and the communication device 190, 290 perform short-range communication such as Bluetooth (registered trademark). Therefore, communication between the user equipment 300, 300a and the communication devices 190, 290 may be disconnected when, for example, the user equipment 300, 300a is taken out of the vehicle cabin. In such a case, the control unit 35 displays a confirmation display on the touch panel display 340. FIG. 8 shows an example of the confirmation display displayed on the touch panel display 340. As shown in FIG. 8, a "confirmation display" 346 is guidance or confirmation asking to "return the user equipment into the vehicle cabin since communication with the vehicle is disconnected" and "check pairing between the vehicle and the user equipment if communication is not restored." Displaying such a "confirmation display" 346 can give the user information on the next action in the update process. The update process can thus be smoothly performed.

Figure 9:
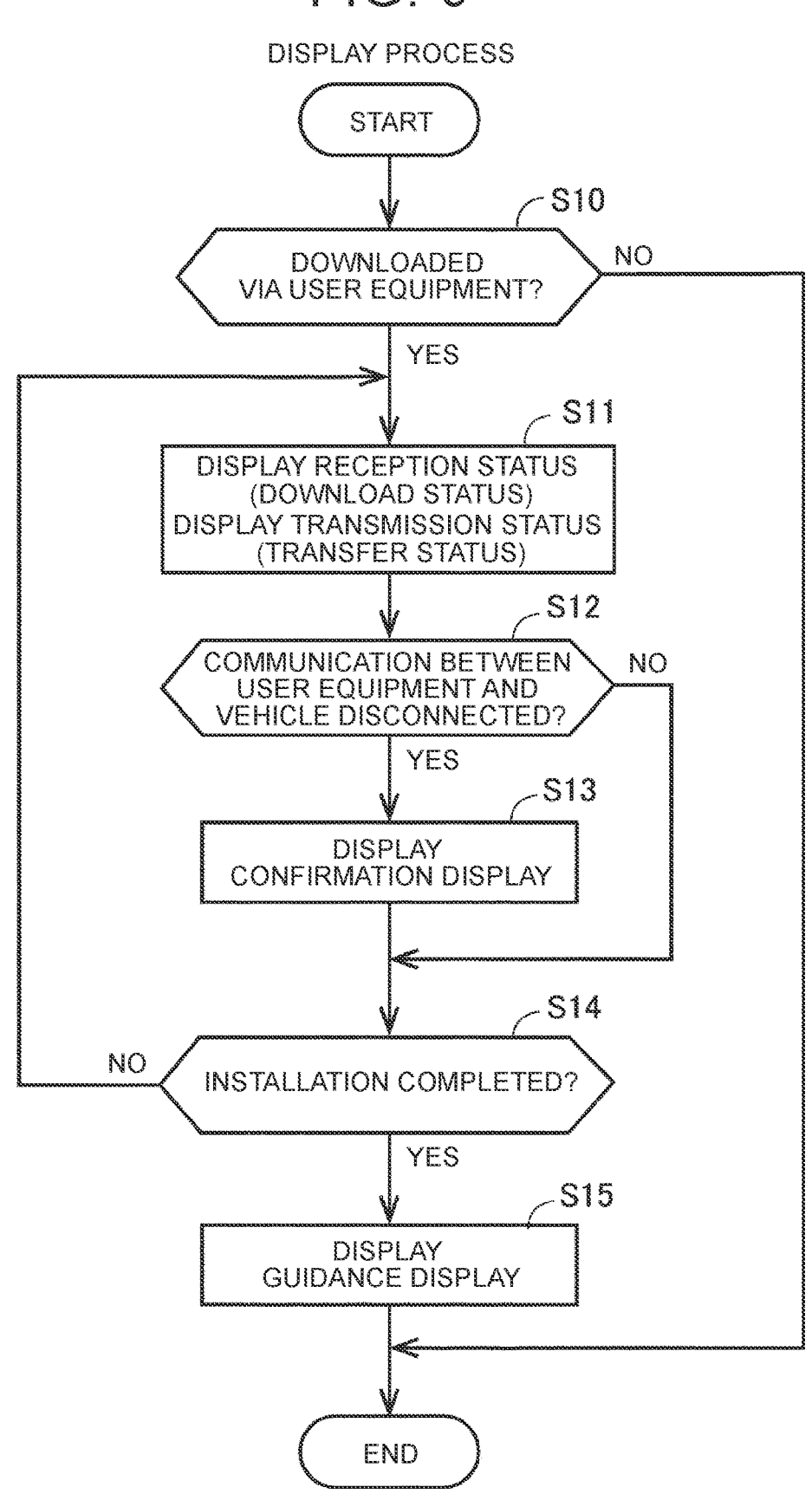
FIG. 9 is a flowchart showing an example of a display process according to the embodiment.

FIG. 9 is a flowchart showing an example of a display process according to the present embodiment. In the present embodiment, the process in this flowchart is performed by the user equipment 300 or the user equipment 300a, but part of the process may be performed by the OTA center 500, the OTA master 110, or the ECU 210. This process is implemented by one or more processors reading and executing a program stored in one or more memories.

The process in this flowchart is started (1) when an icon of the mobile app displayed on the touch panel display 340 of the user equipment 300, 300*a* is tapped (e.g., when the mobile app is brought from background to foreground), (2) when the user equipment 300 receives a campaign notification from the OTA center 500, or (3) when the user equipment 300*a* is notified (instructed) by the vehicle 100 (OTA master 110) to receive a campaign notification.

When the process is started by the above operation (1), the user equipment 300, 300*a* determines in step S10 whether software distributed from the OTA center 500 is being downloaded via the user equipment 300, 300*a*. When the reception unit 31 is not receiving the software, the determination result in step S10 is NO, and the user equipment 300, 300*a* ends the current routine. When the reception unit 31 is receiving the software, the determination result in step S10 is YES, and the process proceeds to step S11.

When the process is started by (2) or (3) described above, the user equipment 300, 300*a* determines in step S10 whether the software distributed from the OTA center 500 is ready to be downloaded via the user equipment 300, 300*a*. When the process is started by (2), the vehicle 200 downloads the software via the user equipment 300. Therefore, the determination result in step S10 is YES, and the process proceeds to step S11.

The vehicle 100 can either download the software distributed from the OTA center 500 using the communication module 113 of the OTA master 110 (without via the user equipment 300*a*) or download the software distributed from the OTA center 500 via the user equipment 300*a*. When the process is started by (3), it means that an instruction to download the software via the user equipment 300*a* has been given by the vehicle 100. Therefore, the determination result in step S10 is YES, and the process proceeds to step S11. In the vehicle 100, the user may select whether to download the software using the communication module 113 or to download the software via the user equipment 300*a*. Alternatively, the OTA master 110 may make this selection based on the communication environment etc.

When the reception unit 31 starts receiving the software, the software reception status (download status) is displayed on the touch panel display 340 in step S11. When the transmission unit 34 starts transferring (transmitting) the software, the software transmission status (transfer status) is displayed on the touch panel display 340.

In the following step S12, it is determined whether the communication between the user equipment 300*a* and the vehicle 100 (communication device 190) is disconnected (or whether the communication between the user equipment 300 and the vehicle 200 (communication device 290) is disconnected). When the communication between the user equipment and the vehicle is disconnected, the determination result in step S12 is YES, and the process proceeds to step S13. When the communication between the user equipment and the vehicle is not disconnected, the determination result in step S12 is NO, and the process proceeds to step S14.

In step S13, the "confirmation display" 346 is displayed on the touch panel display 340. In step S14, it is determined whether installation is completed. The determination result in step S14 is NO and the process returns to step S11 until the reception unit 31 receives an installation completion notification. When the reception unit 31 receives an installation completion notification, the determination result in step S14 is YES, and the process proceeds to S15.

In step S15, the "guidance display" 345 is displayed on the touch panel display 340, and then the current routine ends.

In the present embodiment, the process in which software is downloaded via the user equipment 300, 300*a* to update software on the target ECU (process that is performed when YES in step S10) is an example of the "first update process" in the present disclosure. In the present embodiment, the process in which software is downloaded without via the user equipment 300, 300*a* to update software on the target ECU (process in which software on the target ECU is updated when NO in step S10) is an example of the "second update process" in the present disclosure. In the present embodiment, the "guidance display" 345 and the "confirmation display" 346 are examples of the "information on the next action in the first update process" in the present disclosure. In the present embodiment, step S10 in FIG. 9 is an example of "determining whether the update process is performed using the software that is transmitted to the vehicle via the user equipment" in the present disclosure.

In the present embodiment, when the update process of updating software on the target ECU (in-vehicle ECU) with software received by the reception unit 31 of the user equipment 300, 300*a* (first update process) is performed, the progress of the update process (first update process) is displayed. Information (data) necessary for this update process (first update process) is distributed (transmitted) to the vehicle 100, 200 via the user equipment 300, 300*a*. Therefore, the data that has already been received by the user equipment 300, 300*a* can be used when displaying the progress of this update process (first update process). The use of the data received by the user equipment 300, 300*a* can reduce the communication load. The information on the next action in this update process (first update process) ("guidance display" 345 or "confirmation display" 346) is also displayed. This makes it possible to smoothly proceed with the software update process.

In the present embodiment, in the case where the update process in which software is transmitted to the vehicle without via the user equipment 300, 300*a* to update software on the target ECU (in-vehicle ECU) (second update process) is being performed (when NO in step S10 of FIG. 9), the progress of this update process (second update process) will not be displayed even when there is a request to display the progress of this update process (second update process) (even when the process of the flowchart of FIG. 9 is started). Therefore, the user equipment 300, 300*a* does not need to acquire information (data) necessary to display the progress of this process (second update process) through communication etc. This can reduce the communication load.

In the above example, various types of information are displayed on the touch panel display 340. However, the display is not limited to a device with a touch panel function, and may be a device (e.g., a personal computer (PC)) with an operation unit separate from a display.

The vehicle need not necessarily be a vehicle configured to perform automated driving. The vehicle may be an electrified vehicle (xEV) other than the BEV. The vehicle may be a plug-in hybrid electric vehicle (PHEV) or a hybrid electric vehicle (HEV) that includes an internal combustion engine (e.g. a gasoline engine, a biofuel engine, or a hydrogen engine). The vehicle is not limited to a four-wheeled passenger vehicle. The vehicle may be a bus or a truck, or may be a three-wheeled xEV. The vehicle may have a flight function. The vehicle may be a Mobility-as-a-Service (MaaS) vehicle. The vehicle may be a multipurpose vehicle that is customized depending on the user's intended use of the vehicle. The vehicle may be a mobile shop vehicle, a robotaxi, an automated guided vehicle (AGV), or an agricultural machine. The vehicle may be a small-sized unmanned or single-seater BEV (e.g., a last-mile BEV, an electric wheelchair, or an electric skateboard).

The update data may be the new software. The update data may be difference data indicating the difference between pre-update software and new software (post-update software), or divided data of the new software. When the update data is the difference data or the divided data, the update master or the target ECU may create new software based on the update data.

The embodiment disclosed herein should be construed as illustrative in all respects and not restrictive. The scope of the present disclosure is shown by the claims rather than by the above description of the embodiment and is intended to include all modifications within the meaning and scope equivalent to the claims.

What is claimed is:

1. User equipment comprising one or more processors configured to:

receive data on updating software on an in-vehicle electronic control unit, wherein the data on updating software comprises a software update and a size of the software update;

transmit the received data to a vehicle while receiving the received data; and simultaneously display progress of the reception of the data by the one or more processors, and progress of the transmission of the data by the one or more processor, as progress of a first update process when the first update process is performed, the first update process being a process of updating the software on the in-vehicle electronic control unit using the received data;

wherein the progress of transmission of the data comprises an amount of software data transferred to the vehicle by the user equipment relative to the size of the software update.

2. The user equipment according to claim 1, wherein the one or more processors are configured to display information on a next action in the first update process in addition to the progress of the first update process.

3. The user equipment according to claim 1, wherein the one or more processors are configured not to display progress of a second update process in a case where the second update process is being performed, even when there is a request to display the progress of the second update process, the second update process being a process in which the vehicle receives the data without via the user equipment to update the software on the in-vehicle electronic control unit.

4. The user equipment according to claim 1, wherein the data is updated software on the in-vehicle electronic control unit.

5. A software update system that updates software on an electronic control unit, the software update system comprising:

a server configured to distribute data on updating the software on the electronic control unit, wherein the data on updating software comprises a software update and a size of the software update;

a vehicle equipped with the electronic control unit and configured to communicate with the server; and user equipment, wherein the user equipment is configured to communicate with the server and the vehicle, the user equipment is configured to simultaneously display progress of reception of the data by the user equipment, and progress of transmission of the data by the user equipment to the vehicle, as progress of a first update process, the first update process being a process in which the data distributed from the server is distributed to the vehicle via the user equipment to update the software on the electronic control unit, wherein the progress of transmission of the data comprises an amount of software data transferred to the vehicle by the user equipment relative to the size of the software update, and the user equipment is configured not to display progress of a second update process, the second update process being a process in which the data distributed from the server is distributed to the vehicle without via the user equipment to update the software on the electronic control unit.

6. The software update system according to claim 5, wherein the progress of the first update process includes the progress of reception of the data by the user equipment and the progress of transmission of the data from the user equipment to the vehicle.

7. The software update system according to claim 6, wherein the user equipment is configured to display information on a next action in the first update process in addition to the progress of the first update process.

8. A control method in which progress of an update process of updating software on an in-vehicle electronic control unit is displayed on user equipment that updates the software on the in-vehicle electronic control unit by receiving data on the software that is distributed from a server and simultaneously transmitting the received data to a vehicle, the data on the software comprises a software update and a size of the software update, the control method comprising:

determining whether the update process is performed using the data that is transmitted to the vehicle via the user equipment; and simultaneously displaying progress of the reception of the data by the user equipment, and progress of the transmission of the data from the user equipment to the vehicle, as progress of the update process when determination is made that the update process is performed using the data that is transmitted to the vehicle via the user equipment;

wherein the progress of transmission of the data comprises an amount of software data transferred to the vehicle by the user equipment relative to the size of the software update.

9. A non-transitory storage medium storing a program that causes a computer to perform the control method according to claim 8.

* * * * *